3,011,997
POLYURETHANE TERPOLYMER COMPRISING THE REACTION PRODUCT OF AN ARYLENE DIISOCYANATE, A POLYALKYLENE ETHER GLYCOL AND A DIHYDROXY DIPHENYL MONOSULFONE, AND METHOD OF PREPARING SAME
Hobson D. De Witt, New Wilmington, Pa., assignor to The Chemstrand Corporation, Decatur, Ala., a corporation of Delaware
No Drawing. Filed Sept. 10, 1958, Ser. No. 760,092
9 Claims. (Cl. 260—42)

This invention relates to the production of synthetic resins and particularly to the production of novel polyurethanes suitable for the formation of shaped objects, such as filaments, films, ribbons, bristles and the like.

It is, of course, well-known to prepare polyurethane fibers by reacting a diol with a diisocyanate. Worthy of note is the fiber-forming polymer formed by the reaction of 1,4-butanediol with hexamethylene diisocyanate. This known polymer has certain characteristics that greatly restrict its utility as a general purpose fiber. For example, the fiber does not have sufficient dye affinity to enable the development of a satisfactorily colored product; and the limited range of colors which may be obtained by conventional dyeing techniques is not stable to usual laundering and dry cleaning processes. Furthermore, the fiber has an undesirably low moisture adsorption value.

It is an object of the present invention to provide a new fiber-forming polyurethane having enhanced dye receptivity. Another object of the present invention is to provide a process for the preparation of said new polyurethane. A further object is to provide a composition of matter from which said new polyurethane may be produced.

These and other objects are accomplished in the provision of a polyurethane terpolymer having fiber-forming properties and containing recurring units repeated at intervals in interpolymer relationship along the polymer chain and represented by the following formulas:

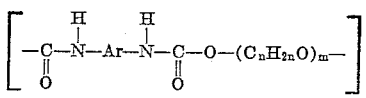

and

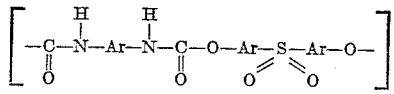

in which Ar is an arylene radical and $n$ is a whole number greater than 1 and may be as high as 4 and $m$ is a whole number from 2 to about 136 indicative of the number of recurring oxyalkylene units.

In accordance with one preferred procedure of the present invention the polyurethane is produced by forming a mixture of the calculated amounts of ingredients comprising: (a) arylene diisocyanate, (b) a polyalkylene ether glycol and (c) a dihydroxydiphenyl sulfone, and heating said mixture at an elevated temperature until a viscous, molten, highly polymeric mass is obtained from which cold-drawable fibers may be formed. The reaction normally is carried out at atmospheric pressure, although the reaction may be carried out at pressures above or below atmospheric pressure. In general, the process employed to prepare the polyurethane is a polymerization reaction which is easily controlled and requires no special equipment.

While the invention includes the production of polymers of relatively low molecular weight that may be useful in the manufacture of coating compositions, lacquers and the like, it is primarily concerned with polymers which have film- and filament-forming properties. When a molecular weight of at least 10,000 is attained, filaments made from the polymers usually exhibit cold-drawing properties, with consequent increase in filament strength. For better filaments the polymerization is carried to the extent that the resultant polymer has a molecular weight of at least 25,000, the molecular weight being determined by measuring the viscosity of dilute polymer solutions in a manner well-known in the art.

The polymeric product obtained by the process of the present invention has properties which make it suitable for such applications as molding, casting and filament formation in the plastics field by conventional techniques. Unexpectedly it was found that the fibers formed from the polymeric product have improved dye receptivity and increased moisture absorption value and thus are especially useful in the production of textile articles. Filaments may be produced by melt spinning, i.e., by extruding a melt of the polymer through suitable orifices and into a cooling atmosphere. Filaments may also be produced by conventional wet or dry spinning methods from solutions of the polymers. If the polymer is of sufficiently high molecular weight, the filaments so formed may be drawn at comparatively low temperatures to fine filaments having good tenacity and elasticity.

A variety of organic arylene diisocyanates may be employed in the practice of the invention. Among such diisocyanates may be mentioned tolylene-2,4-diisocyanate; ortho-phenylene diisocyanate; meta-phenylene diisocyanate; para-phenylene diisocyanate, methylene bis-(4-phenyl isocyanate); diphenylene-4,4'-diisocyanate; 1,5-naphthylene diisocyanate; xylylene-1,4-diisocyanate; and mixtures thereof. Other similar diisocyanates containing substituents which are essentially inert to any of the reactants in the mixture may be employed without departing from the scope of the invention, such as diphenylene-3,3' dimethyl (or dimethoxy)-4,4' diisocyanate.

Representative polyalkylene ether glycols include polyethylene ether glycol, polypropylene ether glycol, polytetramethylene ether glycol, etc. It will be appreciated that the polyglycol may contain inert substituents and not all of the alkylene radicals present need be the same. Glycols containing a mixture of radicals such as in block polymers and copolymers are also useful. Mixtures of these glycols may also be used. For purposes of the present invention, polyethylene ether glycol is preferred. As illustrated in the following examples, polyethylene ether glycols having a mean molecular weight between 200 to 400 are suitable and preferred for the preparation of the polyurethanes. However, the molecular weight thereof may range from about 106 to 6000 or more.

The dihydroxydiphenyl sulfone compounds which may be used to prepare the polyurethanes of the present invention include 4,4'-dihydroxydiphenyl sulfone; 3,4'-dihydroxydiphenyl sulfone; 3,3'-dihydroxydiphenyl sulfone; mixtures thereof; and other similar sulfones which contain no substituents that interfere with the polymerization reaction, such as 4,4'-dihydroxy-3,3'-dimethyldiphenyl sulfone and the 2,4'-dihydroxy isomer thereof.

The amount of organic arylene diisocyanate employed may vary without departing from the invention. In general, the diisocyanate is advantageously present in a molar amount substantially equal to the sum of the molar quantities of the other two reactants. In some reactions it may be desirable to produce a polymer having as terminal groups predominantly isocyanate groups in which event a slight excess of the diisocyanate is employed. In other reactions such terminal groups may not be desired.

In determining the amount of polyalkylene ether glycol which may be employed, it is essential to consider the particular glycol employed as well as the type of product desired. One obtains a polymer having a lower melting point when a relatively large amount of glycol is employed. A correlation seems to exist between the melting point of the resultant polymer and the amount of sulfone employed, since a polymer containing relatively large amounts of sulfone tends to have a high melting point as compared to polymers containing lesser amounts of sulfone. Generally, the glycol is preferably present in a quantity of about 0.5 mol of glycol per mol of diisocyanate. However, the molar ratio, that is the mols of glycol per mol of diisocyanate, may range from about 0.1:1 to 0.9:1. On the other hand, the molar ratio of dihydroxydiphenylsulfone (mols of sulfone/mol of diisocyanate) may range from about 0.9:1 to 0.1:1. In other words, the mol percent of glycol in the reaction product based on the mols of diisocyanate polymerized may range from 10–90 percent and the mol percent of sulfone in the reaction product based on the mols of diisocyanate polymerized may range from 90–10 percent without sacrificing the desirable polymer properties of the present invention.

In producing the polyurethane terpolymer of the present invention the polymerization may be conducted in the presence of catalysts as well as in the presence of molecular weight regulators which act as chain terminators and prevent the formation of very large molecular weight increments together with improving the dye receptivity of the polymer. Such regulators are exemplified in the monohydric polyalkylene oxides and polyalkyl vinyl ethers and modifications thereof, disclosed in copending applications, Serial Nos. 553,424 and 533,433 filed December 16, 1956 (now U.S. Patent 2,895,946 and U.S. Patent 2,905,657, respectively) and having common ownership herewith. Other additives that modify the polymer such as delusterants, plasticizers, pigments, colorants, oxidation inhibitors and the like may also be incorporated in the polymer if desired.

In order to more clearly understand the process of the present invention, the following examples are given which are intended to be illustrative and not limitative.

*Example I*

Into a glass flask 1.74 grams (0.01 mol) of tolylene-2,4-diisocyanate, 2.00 grams (0.005 mol) polyethylene ether glycol having a mean molecular weight of 400, and 1.25 grams (0.005 mol) of 4,4'-dihydroxydiphenyl sulfone were added. After mixing these ingredients, the mixture was warmed gently on a hot plate to start the reaction. As the reaction proceeded the solution became more and more viscous and a molten mass was obtained. This mass was held at 300° C. for 15 minutes to complete the polymerization. Fibers which could be cold drawn were pulled from the melt. Upon cooling to room temperature a glassy appearing solid resulted from the polymerized mass.

*Example II*

This example is given to illustrate the effect of using a lower molecular weight polyethylene ether glycol and different quantities of reactants.

Into a glass flask 0.01 mol of tolylene-2,4-diisocyanate, 0.0025 mol of 4,4'-dihydroxydiphenyl sulfone, and 0.0075 mol of polyethylene ether glycol having a mean molecular weight of 200 were added. After mixing these ingredients, the resulting mixture was warmed gently on a hot plate to start the reaction. The reaction proceeded rapidly and formed a viscous melt within 10–15 minutes. Fibers made from the melt were susceptible to cold drawing.

When the above examples are repeated with other defined arylene diisocyanates, polyglycols, and other difunctional diphenyl sulfones and in the amounts set forth hereinbefore, similar results are obtained. For example, when propylene ether glycol, having the requisite molecular weight are employed, improved polymers are obtained which are readily dyed as described. Likewise, useful polymers are obtained when 3,4'-dihydroxydiphenyl sulfone, 3,3'-dihydroxydiphenyl sulfone or mixtures thereof are used in the place of 4,4'-dihydroxydiphenyl sulfone. In addition, diisocyanates such as ortho- and meta-phenylene diisocyanate give good results. In each case, polymers are obtained which are readily formed into filaments which are dyed to satisfactory shades by conventional techniques.

It is not intended that the invention be limited solely to the details of the embodiments set forth above as it will be recognized by the man skilled in the art that numerous and obvious modifications conforming to the spirit of the invention may be made, and it is intended that the invention be limited solely by the scope of the appended claims.

What is claimed is:

1. A method of producing a fiber-forming polyurethane terpolymer comprising reacting together a mixture of (a) an arylene diisocyanate; (b) a polyalkylene ether glycol having a molecular weight in the range of 106 to 6000; and (c) a dihydroxydiphenyl monosulfone by heating the mixture until a viscous molten mass is obtained from which cold-drawable fibers may be formed; said glycol being present in a quantity of between 0.1 and 0.9 mol per mol of said diisocyanate and said sulfone being present in a quantity of between 0.9 and 0.1 mol per mol of said diisocyanate.

2. A method of producing a fiber-forming polyurethane terpolymer comprising forming a mixture of ingredients comprising (a) tolylene-2,4-diisocyanate; (b) a polyalkylene ether glycol having a molecular weight in the range of 106 to 6000; and (c) a dihydroxydiphenyl monosulfone; said glycol being present in a quantity of between 0.1 and 0.9 mol per mol of said diisocyanate and said sulfone being present in a quantity of between 0.9 and 0.1 mol per mol of said diisocyanate and heating said mixture until a viscous molten mass is obtained from which cold-drawable fibers may be formed.

3. A method of producing a fiber-forming polyurethane terpolymer comprising forming a mixture of ingredients comprising (a) tolylene-2,4-diisocyanate; (b) a polyalkylene ether glycol having a molecular weight in the range of 106 to 6000; and (c) 4,4'-dihydroxydiphenyl sulfone; said glycol being present in a quantity of between 0.1 and 0.9 mol per mol of said diisocyanate and said sulfone being present in a quantity of between 0.9 and 0.1 mol per mol of said diisocyanate and heating said mixture at an elevated temperature until a viscous molten mass is obtained from which cold-drawable fibers may be formed.

4. A method of producing a fiber-forming polyurethane terpolymer comprising forming a mixture of ingredients comprising (a) tolylene-2,4-diisocyanate; (b) polyethylene ether glycol having a molecular weight in the range of 106 to 6000; and (c) 4,4'-dihydroxydiphenyl sulfone; said glycol being present in a quantity of between 0.1 and 0.9 mol per mole of said diisocyanate and said sulfone being present in a quantity of between 0.9 and 0.1 mol per mol of said diisocyanate and the sum of the mols of said glycol and said sulfone being 1.0 and heating said mixture at an elevated temperature until a viscous molten mass is obtained from which cold-drawable fibers may be formed.

5. A method of producing a fiber-forming polyurethane terpolymer comprising forming a mixture of ingredients comprising (a) tolylene-2,4-diisocyanate; (b) polyethylene ether glycol having a molecular weight in the range of 200 to 400; and (c) 4,4'-dihydroxydiphenyl sulfone; said glycol and said sulfone each being present in quantities of about 0.5 mol per mol of said diisocyanate and heating said mixture at an elevated temperature until a viscous molten mass is obtained from which cold-drawable fibers may be formed.

6. A fiber-forming polyurethane terpolymer comprising the reaction product of (a) an arylene diisocyanate; (b) a polyalkylene ether glycol having a molecular weight in the range of 106 to 6000; and (c) a dihydroxydiphenyl monosulfone, said glycol being present in a quantity of between 0.1 and 0.9 mol per mol of said diisocyanate and said monosulfone being present in a quantity between 0.9 and 0.1 per mol of said diisocyanate, said terpolymer containing recurring units repeated at intervals along the polymer chain in interpolymer relationship and represented by the following formulas:

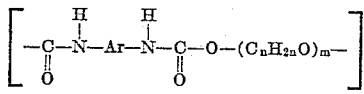

and

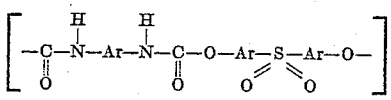

in which Ar is an arylene radical, $n$ is a whole number between 1–4 and $m$ is a whole number from 2 to about 136.

7. The product as defined in claim 6 where (c) is 4,4′-dihydroxydiphenyl sulfone.

8. The product as defined in claim 7 where (a) is tolylene-2,4-diisocyanate and (b) is polyethylene ether glycol.

9. The product as defined in claim 8 wherein the said glycol and the said sulfone each are present in quantities of about 0.5 mol per mol of the said diisocyanate.

References Cited in the file of this patent

UNITED STATES PATENTS

| | | |
|---|---|---|
| 2,843,568 | Benning et al. | July 15, 1958 |
| 2,929,800 | Hill | Mar. 22, 1960 |

FOREIGN PATENTS

| | | |
|---|---|---|
| 641,396 | Netherlands | Oct. 15, 1949 |
| 1,007,502 | Germany | May 2, 1957 |